United States Patent [19]

Hoiness

[11] Patent Number: 5,474,842
[45] Date of Patent: Dec. 12, 1995

[54] ARAMID PARTICLES AS WEAR ADDITIVES

[76] Inventor: David E. Hoiness, 60 Jeremiah Collett Rd., Glen Mills, Pa. 19342

[21] Appl. No.: 357,360

[22] Filed: Dec. 15, 1994

Related U.S. Application Data

[63] Continuation of Ser. No. 166,785, Dec. 13, 1993, abandoned, which is a continuation-in-part of Ser. No. 752,943, Aug. 20, 1991, abandoned.

[51] Int. Cl.$^6$ ........................................................ B32B 5/16
[52] U.S. Cl. .......................... 428/327; 628/297; 628/283; 628/240; 628/500; 523/155; 523/156
[58] Field of Search ................................. 428/500, 908.8, 428/224, 283, 240, 288, 297, 327; 523/155, 156

[56] References Cited

U.S. PATENT DOCUMENTS

| | | | |
|---|---|---|---|
| 4,219,452 | 8/1980 | Littlefield | 260/3 |
| 4,324,706 | 4/1982 | Tabe et al. | |
| 4,374,211 | 2/1983 | Gallagher et al. | 523/156 |
| 4,446,203 | 5/1984 | Okubo et al. | |
| 4,548,678 | 10/1985 | Latlin et al. | |
| 4,563,386 | 1/1986 | Schwartz | 428/283 |
| 4,725,392 | 2/1988 | Matsui et al. | 264/85 |
| 4,775,705 | 10/1988 | Parker et al. | 523/153 |
| 5,009,820 | 4/1991 | Coates et al. | 264/13 |

FOREIGN PATENT DOCUMENTS 2203901 10/1990 Japan.

Primary Examiner—Patrick J. Ryan
Assistant Examiner—Merrick Dixon

[57] ABSTRACT

A composite friction or gasketting material is disclosed having a combination of thermoset or thermoplastic matrix resin, fiber reinforcing material, and aramid particles. The composite material exhibits improved wear resistance when compared with materials having no aramid particles.

16 Claims, 1 Drawing Sheet

ARAMID PARTICLES AS WEAR ADDITIVES

This is a continuation of application Ser. No. 08/166,785, filed Dec. 13, 1993, now abandoned, which was a continuation-in-part of application Ser. No. 07/752,943, filed Aug. 20, 1991, now abandoned.

FIELD OF THE INVENTION

This invention relates to composites for use as friction materials or gasketting. The composites include fibers, in the form of floc or pulp, and aramid polymer particles substantially homogeneously distributed in a matrix resin. The composites are particularly useful in high temperature applications.

DESCRIPTION OF THE PRIOR ART

Friction materials are well known using fibers which exhibit high temperature strength in a matrix resin and, optionally, using fillers of various kinds for other purposes. The fiber which was historically used in such friction materials was asbestos; but, recently, other fibers have been substituted therefor. U.S. Pat. No. 4,219,452, issued Aug. 26, 1980 on the application of Littlefield, discloses a composite friction product comprising an elastomeric binder, an aramid fiber, and a complicated combination of additional materials. The friction product can include a thermoset resin, for example phenolic resin, but only in relatively small amount. The aramid fiber is utilized as a replacement for asbestos.

U.S. Pat. No. 4,324,706, issued Apr. 13, 1982, on the application of Tabe et al., discloses a friction product which includes a thermoset matrix polymer, aromatic polyamide pulp-like particles, other heat resistant fibrous materials, and friction-regulating materials. The heat resistant fibrous material may, also, be aromatic polyamides; but there is only disclosure therein of using pulp-like particles with tentacles and no disclosure of the use of particles of aromatic polyamides without tentacles in that friction material.

U.S. Pat. No. 4,374,211, issued Feb. 15, 1983 on the application of Gallagher et al., discloses a friction product utilizing aramid polymer pulp as a replacement for asbestos, aramid fibers as a reinforcing material, and thermoset polymeric matrix binder. These friction products also include inorganic particles or powders used as fillers and modifiers for the product. Japanese Patent Publication Tokuko 1-33698, published Jul. 14, 1989 on the application of Honma discloses a friction material which utilizes a thermoset binder resin; reinforcement fibers of glass, ceramic, organic, metallic, or carbon materials; and a significant amount of hardened polyimide powder.

SUMMARY OF THE INVENTION

The present invention provides a composite friction or gasketting material comprising a matrix resin, a fiber reinforcing material, and aramid particles wherein the composite is 10 to 95 percent, by weight, matrix resin, 1 to 40 percent, by weight, fiber reinforcing material, and 1 to 65 percent, by weight, aramid particles and the weight ratio of aramid particles to fiber reinforcing material is greater than 1/4 and preferably from 1/4 to 4/1. The matrix resin can be thermoset or thermoplastic. The fiber reinforcing material can be pulp or floc and is preferably aramid from 1 to 6 mm in long dimension. The aramid particles are preferably poly(p-phenylene terephthalamide) and are from 10 to 500 microns and preferably 50 to 500 microns in average diameter. The aramid particles are in the form of a powder wherein individual particles are substantially free from fibrils and wherein the freedom from fibrids is evidenced by the low surface area for these particles.

For the composite friction material of this invention, as it relates to friction products such as brakes and brake shoes, the composite is generally 10 to 20 percent, by weight, matrix resin; for composite friction materials for use in wear resistant resin applications, the composite is generally 75 to 95 percent, by weight, matrix resin; and for the composite friction material of this invention for use in gaskets and gasketting, the composite is generally between that of brakes and wear resistant resins, that is, from about 15 or 20 to 75 percent, by weight, matrix resin. It can, also, be pointed out that, with regard to the weight ratio of aramid particles to fiber reinforcing material, gaskets and gasketting material and wear resistant resins utilize a ratio which is near the low recommended range, that is, from about 1/1 to 1/4; and for brakes and friction products, the ratio of aramid particle to fiber reinforcing material is in the high recommended range, that is, from about 1/1 to 4/1 and higher. A process is provided for making a composite which comprises a matrix resin, a fiber reinforcing material, and aramid particles wherein the aramid particles and the fiber reinforcing material, in a weight ratio of greater than 1/4 and preferably from 1/4 to 4/1, are homogeneously combined and, then, that combination is blended with the matrix resin.

DETAILED DESCRIPTION OF THE INVENTION

Figure 1:
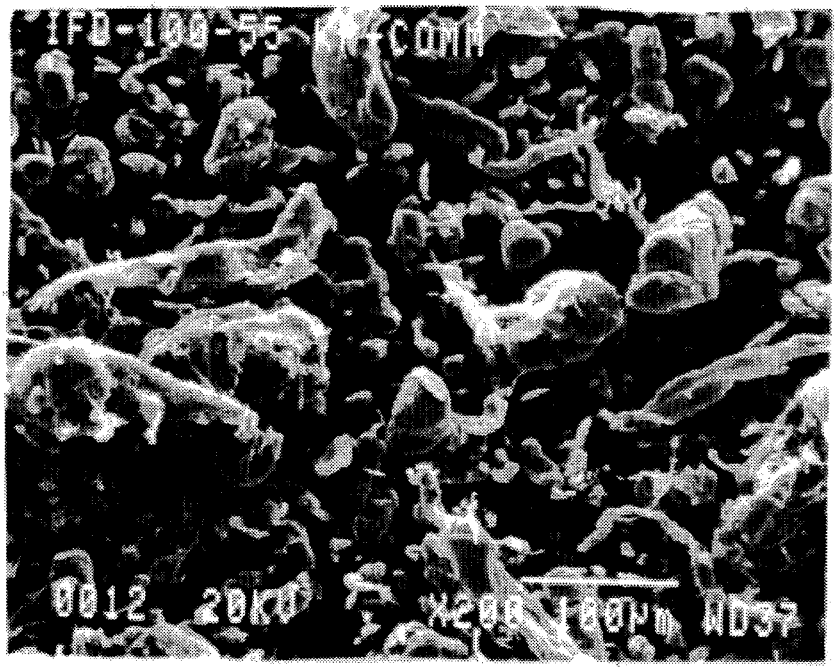
FIG. 1 is a photomicrograph, at ×200 magnification, of the fibril-free aramid particles used in practice of this invention

The composite material of this invention comprises a matrix resin, aramid fibers, and aramid particles and is, generally, useful for friction products and gasketting. The composite material may, also, include various filler materials to accomplish any desired or desirable alternative purpose.

The composite of this invention finds use in friction materials due to its resistance to wear and high temperature stability.

Matrix resins in these composites can be selected from the broad groups of thermoplastic and thermoset, depending upon the intended use and the desired result. Thermoset materials are materials which exhibit no melting temperature and which yield high char residues. Because the usual intended uses are of a high temperature, high stress, nature, the matrix resin is usually a thermoset material. Thermoset materials are preferred for high temperature, high stress uses because they decompose rather than melt. Strength cannot be maintained if the matrix melts and flows. Eligible thermoset materials include phenolic resins, aromatic polyamides, polybenzoxadiazoles, polyimides, polybenzimidazoles and the like.

Thermoplastic materials are materials which melt and resolidify at certain temperatures under particular conditions. Thermoplastic materials are generally used in gasketting and in relatively low temperature, low friction applications. Eligible thermoplastic materials include aliphatic polyamides such as nylon 6 and nylon 66, polyesters, acrylics, fluoropolymers such as TEF and FEP, and the like.

The matrix resin, whether thermoset or thermoplastic, serves as a carrier for the other components of the composite of this invention, as an ablative material and matrix binder in friction applications, and as a void filler, sealant and binder in gasketting applications. The matrix resin is from 10 to 95 percent, by weight, of the total composite. Composites utilizing thermoset matrix resins are generally relatively low in resin content and composites utilizing thermoplastic matrix resins are generally at the high end of the matrix resin range.

Short fibers have long been used to reinforce composite sheet structures comprising matrix resins. In some cases the short fibers have served a dual purpose of reinforcing the structure and, also, resisting frictional forces. In the present invention, the short fibers are, primarily, used to reinforce the structure, although, they may have a frictional function, also. The fibers may be made from inorganic or organic materials and may be in the form of pulp or floc. Although glass is often used, organic materials are preferred and it is preferred that the organic materials are in the form of pulp.

Fibers are generally from 0.01 to 50 mm in length, and preferably about 1 to 10 mm; and the fibers generally have a diameter of 0.01 to 200 microns and preferably about 5 to 50 microns. Additionally, it is preferred that the fibers have a surface area of greater than 5 $m^2/g$ and a ratio of length to diameter of 10 to 10,000, preferably 20 to 1000.

Eligible inorganic fiber materials include carbon, glass, metal, mineral, asbestos and the like.

Eligible organic fiber materials include aliphatic polyamides, polyesters, polyacrylonitriles, polyvinyl alcohols, polyolefins, polyvinyl chlorides, polyvinylidene chlorides, polyurethanes, polyfluorocarbons, phenolics, polybenzimidazoles, polyphenylenetriazoles, polyphenylene sulfides, polyoxadiazoles, polyimides, aromatic polyamides, and the like. Because friction and gasketting are often high heat, high stress, applications, the preferred fibers are strong and stable at high temperatures. Preferred fiber materials are aromatic polyamides (aramids), polybenzoxadiazole, polyben-zimidazole, and the like. Fibers of aramids such as poly(p-phenylene terephthalamide) and poly(m-phenylene isophthalamide), are particularly preferred.

The fibers can be used in the form of floc or pulp. Floc is made by cutting fibers into short lengths without significant fibrillation of the fiber ends; and the lengths of floc fibers may range from 1 to 10 mm. Floc less than about 1 mm does not add significantly to the strength of the composite in which it is used; and floc more than about 6 mm often does not function well because the individual fibers may become entangled and cannot be adequately and uniformly distributed throughout the composite.

Short fibers are more effective in strengthening the composite in the form of pulp. Pulp can be made by grinding fibers to fibrillate the ends of short pieces of the fiber material. An example of pulp and a method for making it can be found in the Research Disclosure Journal Number 13675. Pulp can, also, be made by casting a polymerizing solution of polymer material and grinding the solution, once solidified, such as is disclosed in U.S. Pat. No. 5,028,372 granted Jul. 2, 1991 on the application of Brierre et al. In the case of pulp, the preferred material for this invention is poly(p-phenylene terephthalamide). Pulp particles differ from floc, as so-called short fibers, by having a multitude of fibrils or tentacles extending from the body of each pulp particle. Those fibrils or tentacles provide minute, hair-like, anchors for reinforcing composite materials and cause the pulp to have a very high surface area. Aramid pulp and pulp-like particles generally have a surface area of 5 to 15, on the order of 10 square meters per gram.

Aramids, the preferred material for fibers and particles in practice of this invention, are intended to refer to wholly aromatic polycarbonamide polymers and copolymers consisting essentially of recurring units of the formula $$-HN-AR_1-NH-CO-AR_2-CO-  \qquad (I)$$

wherein $AR_1$ and $AR_2$, which may be the same or different, represent divalent aromatic groups. Para-aramids are most preferred and refer to para-oriented aromatic polycarbonamides of Formula I, above, wherein $AR_1$ and $AR_2$, which may be the same or different, represent divalent, para-oriented, aromatic groups. By "para-oriented" is meant that the chain extending bonds from aromatic groups are either coaxial or parallel and oppositely directed, for example, substituted or unsubstituted aromatic groups including 1,4-phenylene, 4,4'-biphenylene, 2,6-naphthalene, and 1,5-naphthalene. Substituents on the aromatic groups other than those which are part of the chain extending moieties should be nonreactive and must not adversely affect the characteristics of the polymer for use in the practice of this invention. Examples of suitable substituents are chloro, lower alkyl and methoxy groups. The term para-aramid is also intended to encompass para-aramid copolymers of two or more para-oriented comonomers including minor amounts of comonomers where the acid and amine functions coexist on the same aromatic species, for example, copolymers produced from reactants such as 4-aminobenzoyl chloride hydrochloride, 6-amino-2-naphthoyl chloride hydrochloride, and the like. In addition, para-aramid is intended to encompass copolymers containing minor amounts of comonomers containing aromatic groups which are not para- oriented, such as, for example, m-phenylene and 3,4'-biphenylene.

In accordance with a preferred form of the invention, at least about 80 mole percent of the aromatic diamine is p-phenylene diamine and at least 80 mole percent of the aromatic diacid halide is a terephthaloyl halide, for example, terephthaloyl chloride. The remainder of the aromatic diamine can be other para-oriented diamines including, for example, 4'-diaminobiphenyl, 2-methyl-p-phenylene diamine, 2-chloro-p-phenylene diamine, 2,6-naphthalene diamine, 1,5-naphthalene diamine, 4,4'-diaminobenzanilide, and the like. One or more of such paraoriented diamines can be employed in amounts up to about 20 mole percent together with p-phenylene diamine. The remainder of the aromatic diamine may include diamines which are not para-oriented such as m-phenylene diamine, 3,3'-diaminobiphenyl, 3,4'-diaminobiphenyl, 3,3'-oxydiphenylenediamine, 3,4'-oxydiphenylenediamine, 3,3'-sulfonyldiphenylenediamine, 3,4'-sulfonyldiphenylene diamine, 4,4'-oxydiphenylenediamine, 4,4'-sulfonyldi-phenylenediamine, and the like, although it is typically necessary to limit the quantity of such coreactants to about 5 mole percent.

Similarly, the remainder of the diacid halide can be para-oriented acid halides such as 4,4'-dibenzoyl chloride, 2-chloroterephthaloyl chloride, 2,5-dichloroterephthaloyl chloride, 2-methylterephthaloyl chloride, 2,6-naphthalene dicarboxylic acid chloride, 1,5-naphthalene dicarboxylic acid chloride, and the like. One or mixtures of such para-oriented acid halides can be employed in amounts up to about 20 mole percent together with terephthaloyl chloride. Other diacid halides which are not para-oriented can be employed in amounts usually not greatly exceeding about 5 mole percent such as isophthaloyl chloride, 3,3'-dibenzoyl chloride, 3,4'-dibenzoylchloride, 3,3'-oxydibenzoyl chloride, 3,4'-oxydibenzoyl chloride, 3,3'-sulfonyldibenzoyl chloride, 3,4'-sulfonyldibenzoyl chloride, 4,4'-oxydibenzoyl chloride, 4,4'-sulfonyldibenzoyl chloride, and the like.

Again, in a preferred form of the invention, up to 20 mole percent of para-oriented aromatic amino acid halides may be used.

The aromatic diamine and the aromatic diacid halide are reacted in an amide solvent system preferably by low temperature solution polymerization procedures (that is, less than 60° C.) similar to those shown in U.S. Pat. No. 4,308,374 in the names of Vollbracht et al. and U.S. Pat. No. 3,063,966 in the names of Kwolek et al. for preparing poly(p-phenylene terephthalamide). Suitable amide solvents, or mixtures of such solvents, include N-methyl pyrrolidone (NMP), dimethyl acetamide, and tetramethyl urea containing an alkali metal halide. Particularly preferred is NMP and calcium chloride with the percentage of calcium chloride in the solvent being between about 4–10% based on the weight of NMP.

The fiber constituent of the composite of this invention represents about 1 to 60 percent, by weight, of the composite. As previously stated, the fiber is present as a reinforcement and less than about 1 percent does not provide significant improvement in the strength of the composite. More than about 60 percent causes the composite to exhibit excessive compressibility and porosity.

The element of the composite of this invention which is believed to yield a surprising benefit and which results in a composite which has not before been known, is particulate, substantially fibril-free, aramid polymer. Particles of aramid polymer are blended with the short fibers and the combination of particles and fibers yields a composite having extremely good wear properties and unexpectedly high wear life.

Figure 2:
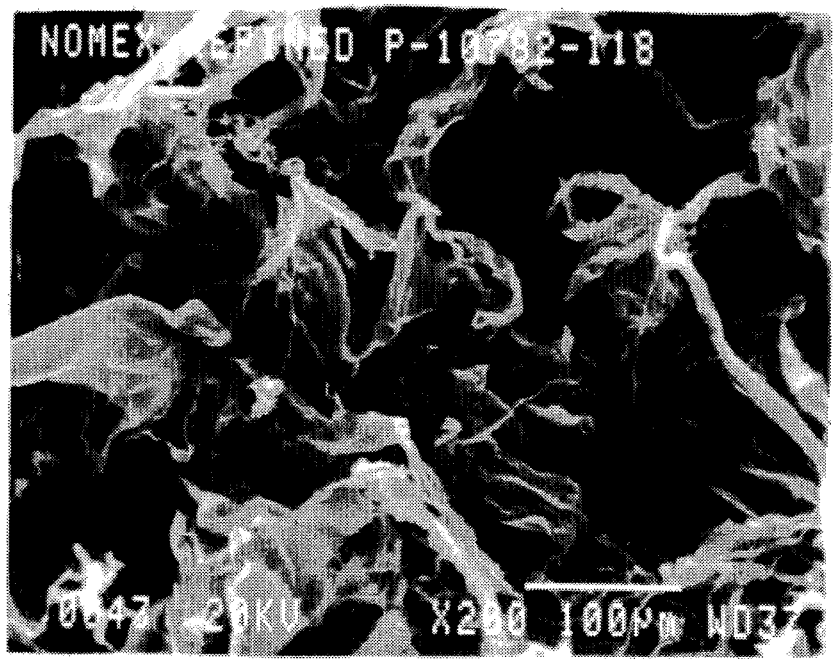
FIG. 2 is a photomicrograph, at ×200 magnification, of pulp-like aramid particles with fibrils or tentacles as used here, and in the prior art for composite reinforcement but not for wear resistance in friction products.

Referring to FIG. 1, there is shown the substantially fibril-free, relatively low surface area, aramid particle powder of this invention at a magnification of ×200. The individual particles are generally rounded, in shape, and are without the fibrils or tentacles which characterize refined aramid particles usually used as reinforcement in polymer composites. FIG. 2 shows pulp-like, relatively high surface area particles with fibrils and tentacles, as made and described in U.S. Pat. No. 4,324,706, issued Apr. 13, 1982 on the application of Tabe et al.; and as disclosed therein to be useful with floc in friction products. That patent requires that all such pulp-like particles must have "a plurality of tentacle-like projections". It is a surprise in the practice of this invention that the composite material using the fibril-free aramid particles herein yields equivalent or improved friction performance when compared with composites using fibrillated or pulp-like particles.

The aramid particles serve, among other things, as friction materials and, for that reason, should be stable to high temperatures. The particles are aramids, as described hereinbefore, and it is preferred that they be para-aramids, also, as described hereinbefore. The most preferred material for the para-aramids of this invention is poly(p-phenyleneterephthalamide).

Because they are substantially fibril-free, the aramid particles of this invention also serve as a compounding agent to assist in dispersing the fibers in the matrix resin. Particles which perform this function are often known as processing agents and it has been determined that such processing agents are preferably very small—on the order of 10 to 250 microns. The aramid particles of this invention from 10 to 250 microns are, therefore, useful as both friction materials and as processing agents in practice of this invention. Below about 50 microns, however, the particles appear to be losing effectiveness as friction additives and above about 500 microns the combination of fibers and particles is difficult to accomplish effectively. It has been determined that a combination of fibers and particles disperses in the matrix polymer more easily and uniformly than fibers, alone; and that, as to the fibers alone, short fibers disperse easily and uniformly than longer fibers. It has been determined that aramid particles from 125 to 150 microns (100–120 mesh) average diameter are especially preferred when the matrix resin is thermoset and that 125 to 250 microns (60–120 mesh) is an especially preferred size for use with thermoplastic matrix resins. Overall, aramid particles from about 75 to 250 microns are preferred for practice of this invention.

The aramid particles add wear resistance to the composite. It is believed that aramid particles dispersed substantially homogeneously throughout the matrix resin provide, by virtue of the high temperature characteristics of the aramid polymer, very small sites of increased wear resistance effective up to the glass transition temperature of the aramid material. It is understood that the glass transition temperature of poly(p-phenylene terephthalamide) is higher than its degradation temperature and that, therefore, aramid particles provide additional wear resistance at extremely high temperatures.

It has been determined that the excellence of the composite of this invention is, at least in part, a function of the ratio of fibers to aramid particles in the matrix resin. The weight ratio of aramid particles to fibers should be greater than ¼ and preferably from ¼ to ⁴⁄₁ to obtain the best results for general purposes. More specifically, preferred friction products of the present invention have a weight ratio of aramid particles to fibers of about ¼ to ¹⁄₁ using thermoset polymer matrices. Preferred gasketting compositions and friction compositions using thermoplastic polymer materials of the present invention have a weight ratio of aramid particles to fibers of about ¼ to ½.

The particle constituent of the composite of this invention should be about 1 to 65 percent, by weight, aramid particles.

There are some applications for the composition of this invention wherein the total concentration of aramid fibers and aramid particles should be at the upper specified limit. It has been determined that, although there is a maximum practical concentration due to system viscosity considerations, the upper concentration limit is higher for particles than it is for fibers; and, for a combination of fibers and particles, the upper concentration limit is higher as the proportion of particles is increased. Although not completely understood, it is believed that the fiber and particle aramid concentrations and the system viscosity are related, somehow, to the bulk density of the fibers and the particles prior to distribution in the matrix polymer;—a higher bulk density permitting a higher concentration of aramid materials.

In addition to fibers and aramid particles, the composite may include other filler materials. Such filler materials might be hard minerals added to promote friction. Such minerals might be iron grit, sand, fused silica, and the like. Also, friction modifiers might be added to the composition. Such friction modifiers might include materials such as graphite, partially cured cashew-resin solids, lead and lead compounds such as lead sulfide and the like. Friction-regulating agents can be added including alumina, silica, talc, kaolin, mica, and the like. These filler materials should generally have particle sizes of about 300 microns or less and can be added to the composite in concentrations of from 1 to as much as 50 percent, preferably from about 1 to 35 percent, by weight. There is less need for filler materials in the composite of this invention than in composites of the prior art because the aramid particles serve, to some extent, as filler materials. Filler materials are usually used for altering the coefficient of friction of the composition. Of course, the concentration of filler materials depends entirely on the kind of filler and the reason for its use.

Aramid particles are made by comminuting aramid polymer to the desired size. For example, aramid polymer made in accordance with the teachings in previously-cited U.S. Pat. Nos. 3,063,966 and 4,308,374 is finished in the form of a water-wet crumb which, for purposes of this invention, can be dried and then pulverized in a hammer mill to an average diameter of 50 to 500 microns. Once dried and pulverized, the aramid particles can be classified and particles of the desired size range can be isolated for use.

It has been determined that the aramid particles of this invention have a relatively low surface area—less than 2 to as little as 0.2 square meters per gram—indicative of the difference between high surface area pulp-like particles with fibrils and the fibril-free aramid particles of this invention. Pulp-like aramid particles with fibrils generally exhibit surface area greater than 5 square meters per gram—on the order of 10 square meters per gram. Surface area is determined by the B.E.T. method using nitrogen.

Inherent Viscosity (IV) is indication of the molecular weight of a polymer and is defined by the equation:

$$IV = \ln(h_{rel})/c$$

where c is the concentration (0.5 gram of polymer in 100 ml of solvent) of the polymer solution and $h_{rel}$(relative viscosity) is the ratio between the flow times of the polymer solution and the solvent as measured at 30° C. in a capillary viscometer. The inherent viscosity values reported and specified herein for the aramid particles are determined using concentrated sulfuric acid (96% $H_2SO_4$). For practice of this invention, para-aramid particles should exhibit an IV of from about 4, or perhaps slightly lower, to 8 or higher. At least within that rather broad range of IV values, it appears that performance of the para-aramid particles is substantially independent of IV.

The aramid particles are combined with the fibers in such a way that the particles are intermingled with or coated on the individual fibers. Such a combination can be accomplished in a wet state by means of a hydropulper or in a dry state by means of mixing mills such as a turbulent air mill like a Turbomill, an Ultra-Rotor, or an Eirich mixer. It is often desirable to "open" the fibers by subjecting them to turbulent or shear forces before introducing the aramid particles. A Turbomill is described in U.S. Pat. No. 3,610,542 and is sold by Matsuzaka Company, Ltd., Tokyo. An Ultra-Rotor Mill is sold by Jackering GmbH & Co. KG, Germany. An Eirich mixer is a heavy-duty mixer with high speed blades in a closed, counter-rotating, vessel with a wall scraping bar resulting in high speed collesions of individual particles. Eirich mixers are sold by Eirich Machines, Inc., New York.

Once the combination of fibers and aramid particles has been made, that combination can be mixed with the matrix resin. Mixing with the matrix resin can be accomplished by a dry dispersion of all of the components, a liquid dispersion (such as in water) of all undissolved components, a dispersion of the fiber and particle components in a solution of the matrix resin, or by any other means utilized to make mixtures of materials. When the matrix resin is a thermoset resin, the combination of fibers and aramid particles can be blended with the components of the thermoset matrix resin recipe and subjected to a curing cycle appropriate for the particular matrix resin being used. It is, also, possible to use "staged" systems, such as in the case of phenolic resins wherein a blend can be made of an "A-stage" phenolic and the fiber/particle combination prior to finally and completely curing the composition.

When the matrix resin is a thermoplastic resin, the combination of fibers and aramid particles can be blended at a high concentration with the thermoplastic resin to make a concentrate for later blending with additional thermoplastic resin. The concentrate can be provided in some convenient size and shape such as by being formed into pellets; and then the pellets can be used as a source of fiber and particles in later applications. The concentrate is usually made having 5–35 weight percent particles and 5–35 weight percent fibers.

DESCRIPTION OF THE PREFERRED EMBODIMENTS

EXAMPLE 1

In this example, aramid particles of poly(p-phenylene terephthalamide) (PPD-T) were combined with other components to make friction materials of this invention; and those friction materials were compared with known friction materials using pulp of PPD-T and with a control material using no aramid at all (no fibers and no particles).

Novolac phenolic resin was used as a thermoset matrix resin for the friction materials of this example; and the composition recipes were as follow:

|  | Compositions | | | |
| --- | --- | --- | --- | --- |
|  | Ex. 1a (%) | Ex. 1b (%) | Comparative Ex. 1(%) | Control (%) |
| Novolac Resin | 16 | 16 | 16 | 16 |
| Dolomite | 50 | 50 | 50 | 52 |
| Barite | 15 | 15 | 15 | 16 |
| Friction Particles | 15 | 15 | 15 | 16 |
| Aramid Particles | 4 | 2 | 0 | 0 |
| Pulp | 0 | 2 | 4 | 0 |

The Dolomite had a particle size of less than 75 microns; the Barite had a particle size of less than 45 microns; and the Friction Particles had a particle size of less than 400 microns. The Friction Particles were made from cashew oil and were sold by Cardolite Corp. under the trade designation Cardolite NC104-40.

The Aramid Pulp was refined poly(p-phenylene terephthalamide) (PPD-T) fiber having a length of about 5 millimeters and a diameter of about 12 microns and sold by E. I. du Pont de Nemours & Co. under the trade designation KEVLAR aramid pulp.

The Aramid Particles were particles of PPD-T polymer having an inherent viscosity of about 6 g/dL and a variety of average diameters from 75 to 250 microns and surface areas from nearly 2 to about 0.85 square meters per gram. The particles were sized by sieving and the sizes are denoted as the maximum size in a range extending from 75 microns as the minimum.

The components of each composition were mixed to yield a substantially homogeneous mass of material. The aramid particles, the dolomite particles, the barite particles, and the friction particles were combined, dry, in a Littleford mixer, identified as Model 130D; and that was combined with the phenolic resin in a dry, particulate form. That composition was molded into composite articles for testing.

The molding was conducted by preforming the articles at room temperature at 2000 psi for one minute, heating from room temperature to 180° C. at 2000 psi for 15 minutes and postcuring the molded article at 350° C. at no pressure for 16 hours. The articles were tested in accordance with SAE-J-661-a—Brake Lining Quality Control Test Procedure (Chase Test for Friction and Wear). Results of the tests are set out in the table below.

TABLE 1

| Examples | Wear (inch) | Thickness Loss | Mass Loss (%) |
|---|---|---|---|
| Example 1a particle sizes | | | |
| 210 microns (H) | 0.008 | 3.20 | 3.28 |
| 150 microns (H) | 0.010 | 2.69 | 1.77 |
| 125 microns (L) | 0.005 | 1.97 | 2.08 |
| 125 microns (L) | 0.004 | 1.57 | 1.79 |
| Example 1b particle size | | | |
| 250 microns (H) | 0.005 | 1.91 | 1.89 |
| 150 microns (H) | 0.004 | 1.58 | 1.65 |
| 125 microns (L) | 0.003 | 1.20 | 1.68 |
| 125 microns (L) | 0.005 | 1.99 | 1.68 |
| Comparative (pulp only) | | | |
| pulp | 0.008 | 3.83 | 1.02 |
| pulp | 0.007 | 2.89 | 3.12 |
| pulp | 0.007 | 2.71 | 1.97 |
| Control | 0.009 | 3.63 | 3.13 |

In the above table, example designation of "H" means that the PPD-T particles had a high inherent viscosity of at least 6.3 g/dL and designation "U" indicates the PPD-T particles had a low inherent viscosity of slightly less than about 5.5 g/dL. It appears that there is no significant difference between the high viscosity material and the low viscosity material.

EXAMPLE 2

In this example, as in Example 1, above, aramid particles of poly(p-phenylene terephthalamide) (PPD-T) were combined with other components to make friction materials of this invention. In this example, combinations of pulp and particles were used; and friction materials using those combinations were compared with known friction materials using pulp of PPD-T, only. The particles used in this example had a particle size of 125 microns and a surface area of about 1.5 square meters per gram.

Novolac phenolic resin was used as a thermoset matrix resin for the friction materials of this example; and the composition recipes were as follow:

| | Compositions | | | | | | |
|---|---|---|---|---|---|---|---|
| | EXAMPLE | | | | | | |
| | 2a (%) | 2b (%) | 2c (%) | 2d (%) | 2e (%) | 2f (%) | Control (%) |
| Novolac Resin | 16 | 16 | 16 | 16 | 16 | 16 | 16 |
| Dolomite | 50 | 50 | 50 | 50 | 50 | 50 | 50 |
| Barite | 15 | 15 | 15 | 15 | 15 | 15 | 15 |

-continued

| | Compositions | | | | | | |
|---|---|---|---|---|---|---|---|
| | EXAMPLE | | | | | | |
| | 2a (%) | 2b (%) | 2c (%) | 2d (%) | 2e (%) | 2f (%) | Control (%) |
| Friction Particles | 15 | 15 | 15 | 15 | 15 | 15 | 15 |
| Aramid Particles | 0.8 | 1.0 | 1.6 | 2.4 | 3.0 | 3.2 | 0 |
| Pulp | 3.2 | 3.0 | 2.4 | 1.6 | 1.0 | 0.8 | 4 |

The components for this example were the same as those used in Example 1, above.

The components of each composition were mixed and molded as in Example 1, above.

The articles were tested in accordance with SAE-J661—the Chase Test for Friction and Wear. Results of the tests are set out in the table below.

TABLE 2

| | | Chase Test (BAE-J-661 Frict./Wear) | |
|---|---|---|---|
| Example | (%) Particle | Wear (inch) | Loss (%) |
| 2a | 0.8 | 0.002 | 0.80 |
| 2b | 1.0 | 0.003 | 1.20 |
| 2c | 1.6 | 0.003 | 1.19 |
| 2d | 2.4 | 0.002 | 0.80 |
| 2e | 3.0 | 0.003 | 1.18 |
| 2f | 3.2 | 0.002 | 0.79 |
| Control | 0 | 0.007 | 2.89 |

EXAMPLE 3

In this example, compositions similar to those of the previous examples were made and tested in accordance with a Friction And Wear Test named the Kraus Test. The compositions were as set out below.

| | Compositions | | | | |
|---|---|---|---|---|---|
| | Examples | | | | |
| | 3a (%) | 3b (%) | 3c (%) | 3d (%) | Control (%) |
| Novolac Resin | 18 | 18 | 18 | 18 | 18 |
| Filler | 54 | 54 | 54 | 54 | 54 |
| Fibers | 19 | 19 | 19 | 19 | 19 |
| Friction Modifiers | 4 | 4 | 4 | 4 | 4 |
| Aramid Particles | 2.5 | 4.0 | 3.5 | 2.5 | 0 |
| Pulp | 2.5 | 1.0 | 1.5 | 2.5 | 5 |

The Novolac Resin composition included dry novolac and particulate rubber. The filler included magnesium oxide, barium sulfate, lime, graphite, zinc oxide, talc, and coke. The fibers included glass and mineral wool. The friction modifiers included alumina and particulate brass.

The aramid particles had a particle size of 125 microns and a surface area of about 1.5 square meters per gram and the aramid pulp was the same as that used in Example 1, above.

The Kraus Test and the Kraus Test Bench are described by A. Heiss et al. in "Technisches Messen atm" 43 (1976), issue 3, pages 91–100 in an article titled Automatic Test Bench for Determining The Coefficient of Friction of Brake Linings for Disk Brakes of Passenger Cars and Trucks.

TABLE 3

KRAUS TEST

| Example | Pressure (Kg/cm²) | Thickness Loss (mm) front | Back | Total | Flexural Strength (N/mm) Cold | 180° C. |
|---|---|---|---|---|---|---|
| 3a | 4 | 0.07 | 0.06 | 0.13 | 23 | 10 |
|  | 6 | 0.16 | 0.13 | 0.24 |  |  |
|  | 8 | 0.27 | 0.21 | 0.48 |  |  |
|  | TOTAL |  |  | 0.85 |  |  |
| 3b | 4 | 0.07 | 0.05 | 0.12 | 27 | 12 |
|  | 6 | 0.18 | 0.11 | 0.29 |  |  |
|  | 8 | 0.29 | 0.19 | 0.48 |  |  |
|  | TOTAL |  |  | 0.89 |  |  |
| 3c | 4 | 0.07 | 0.06 | 0.13 | 26 | 11 |
|  | 6 | 0.17 | 0.13 | 0.30 |  |  |
|  | 8 | 0.30 | 0.22 | 0.52 |  |  |
|  | TOTAL |  |  | 0.95 |  |  |
| 3d | 4 | 0.07 | 0.05 | 0.12 | 28 | 11 |
|  | 6 | 0.17 | 0.11 | 0.28 |  |  |
|  | 8 | 0.28 | 0.22 | 0.50 |  |  |
|  | TOTAL |  |  | 0.90 |  |  |
| CONTROL | 4 | 0.07 | 0.06 | 0.13 | 26 | 12 |
|  | 6 | 0.16 | 0.13 | 0.29 |  |  |
|  | 8 | 0.30 | 0.22 | 0.52 |  |  |
|  | TOTAL |  |  | 0.94 |  |  |

EXAMPLE 4

In this example, the effect of polymer particles was tested in composites utilizing thermoplastic matrix materials. The composites of this invention were compared with a composite using floc of PPD-T about ½ inch long.

The thermoplastic matrix material was nylon 66 such as that sold under the trademark designation "Zytel 801" by E. I. du Pont de Nemours & Co. The particles were PPD-T as described in Example 1, above, with a size of 125 microns.

To prepare the composition of this invention and make test specimens for this example, the PPD-T particles were extruded with nylon in concentrations which varied from 5 to 30 percent based on the total weight of the composition.

In order to obtain a homogeneous dispersion of the floc in the matrix, for comparative purposes, the floc was extruded as a concentrate in the nylon at a concentration of about 15 to 35, weight, percent and that extruded product was cut into pellets for use in making the comparative test specimens for this example. The pellets were then extruded with nylon to overall floc fiber concentrations ranging from 5 to 30 percent based on the total weight of the composition.

The materials of this example were extruded into plaques 0.25"×3"×5"; and, using those extruded plaques, test washers were machined and tested in accordance with ASTM D3702-78—Standard Test Method for Wear Rate of Materials in Self-Lubricating Rubbing Contact Using a Thrust Washer Testing Machine. The wear surface of the washers was maintained at least 0.020" below the molded surface of the plaques. Tests were conducted without lubrication in ambient room air against AISI 1018 carbon steel at 250 lb/in² and 10 ft/min. In these tests, there was, also, a variety of PPD-T particle sizes used to make the test compositions. The test results are shown in the Table, below.

TABLE 4

| Example | Composition PPD-T (wt %) | Particle Size (u) | Thrust Washer Wear Factor* Mass | Volume | Wear Rate** |
|---|---|---|---|---|---|
| 4a | 10 | 120 | 143 | 134 | 3.58 |
| 4b | 17.5 | 60 | 143 | 144 | 3.57 |
| 4c | 17.5 | 100 | 110 | 113 | 2.75 |
| 4d | 17.5 | 120 | 53 | 41 | 1.33 |
| 4e | 15 | 120 | 111 | 120 | 2.89 |
| CONTROL 1 | 20 | floc | 239 | — | 5.98 |
| CONTROL 2 | 33 | glass | 917 | — | 22.93 |
| CONTROL 3 | 0 | — | 785 | 806 | 19.60 |

*Units for the Wear Factor are:

$$\frac{(in^3 \text{-} min)}{(ft\ lbs\text{-}hr)} \times 10^{-10}$$

**Units for the Wear Rate are (in/hr) × 10⁻⁵

EXAMPLE 5

In this example, the effect of a combination of PPD-T polymer particles and 1 mm long PPD-T floc was tested in composites of this invention utilizing thermoplastic matrix materials. The composites of this invention were compared with a composite using 1 mm long floc of PPD-T, only.

The thermoplastic matrix material was the same nylon 66 as was used in Example 4. The particles were PPD-T as described in Example 1, above, with a size of microns.

The composition of polymer particles and floc was made using particles and a concentrate of floc, prepared as described in Example 4. The composition was made and extruded with a particle concentration of 10% and a floc concentration of 5%, based on the total weight of the composition.

The materials of this example were extruded into plaques and the plaques were made into test washers and tested as described and under the conditions used, in Example 4.

The test results of the washers made in this example were that the Thrust Washer Wear was 5.2 for the mass wear factor, 13.0 for the volume wear factor, and 0.225 for the wear rate. Control washers of the matrix polymer with no additives exhibited a Wear Rate of 22.

In this example, it is seen that the combination of particles with short floc, only 1 mm long, yields especially good results. The short floc can be compounded directly into the matrix polymer and can be, thereby, more uniformly distributed. Uniform fiber distribution results in increased heat deflection temperatures.

EXAMPLE 6

In this example, compositions of this invention using glass fibers and PPD-T polymer particles in a thermoplastic matrix were tested against compositions using glass fibers, only, in a thermoplastic matrix.

The thermoplastic matrix material was the same nylon 66 as was used in Example 4. The particles were PPD-T as described in Example 1, above, with a size of 120 microns. The glass fibers were about 3 mm long.

The composition using the glass fibers and the particles was made by the same process as was used in Example 4.

Several compositions of this invention were made and extruded with a particle concentration of 15 weight percent with 13 and 43 weight percent glass fibers. The control compositions were made and extruded having no particles and glass concentrations of 13 and 43 weight percent, based on the total weight of the composition.

The materials of this example were extruded into plaques and the plaques were made into test washers and tested as described, and under the conditions used, in Example 4. The test results are shown in the Table, below.

TABLE 5

| | Composition | | Wear Factor | | |
|---|---|---|---|---|---|
| Example | PPD-T (Wt %) | Glass (Wt %) | Mass | Volume | Wear Rate |
| 6a | 15 | 13 | 118 | 125 | 3.03 |
| Control | 0 | 13 | 240 | 237 | 5.96 |
| 6b | 15 | 43 | 222 | 224 | 5.57 |
| Control | 0 | 43 | 245 | 243 | 6.10 |
| 6c | 15 | 0 | 111 | 120 | 2.89 |

EXAMPLE 7

In this example, compositions of PPD-T particles in a thermoplastic matrix were tested with a wide range of PPD-T particle concentrations.

The thermoplastic matrix material was nylon 66 from a product sold under the trademark designation "Zytel 103HS" by E. I. du Pont de Nemours & Co. The particles were PPD-T, as described in Example 1, above, with a size of 120 microns.

The composition using the particles was made by the same extruding process as was used in Example 4. Compositions having wide range of PPD-T particle concentrations were made and extruded into plaques and the plaques were made into test washers and tested as described, and under the conditions used, in Example 4. The test results are shown in the table below.

TABLE 6

| | Composition PPD-T | Wear Factor | | |
|---|---|---|---|---|
| Example | (Wt %) | Mass | Volume | Wear Rate |
| 7a | 0 | 911 | 921 | 22.9 |
| 7b | 1 | 490 | 498 | 12.35 |
| 7c | 3 | 381 | 352 | 9.16 |
| 7d | 5 | 408 | 397 | 10.06 |
| 7e | 15 | 111 | 120 | 2.89 |
| 7f | 30 | 131 | 117 | 3.10 |

EXAMPLE 8

In this example, compositions of this invention were tested using PPD-T polymer particles in a thermoplastic matrix. Those compositions were compared with controls of the matrix, alone, and compositions using PPD-T floc in the matrix.

The thermoplastic matrix material was acetal resin such as that sold under the trademark designation "Celon M90" by Celanese. The particles were PPD-T as described in Example 1, above, with a size of 125 microns. The floc was about 4 mm long; and the composition using floc was made from a concentrate prepared in the same way as was described in Example 4.

The composition of the invention was made and extruded with a particle concentration of 17.5%, based on the total weight of the composition. The composition of the control using PPD-T floc, alone, was made and extruded with a floc concentration of 15%, based on the total weight of the composition.

The materials of this example were extruded into plaques and the plaques were made into test washers and tested as described, and under the conditions used, in the Example 4. The test results are shown in the Table, below. Thrust Washer Wear tests were conducted without lubrication in ambient room air against AISI 1018 carbon steel at 500 lb/in$^2$ and 10 ft/min. In these tests, there were, also, two PPD-T particle sizes used to make the test compositions.

TABLE 7

| | Composition | | Thrust Washer Wear | | |
|---|---|---|---|---|---|
| | PPD-T | Particle | Wear Factor | | Wear |
| Example | (Wt %) | Size(u) | Mass | Volume | Rate |
| 8a | 17.5 | 250 | 40 | 42 | 2.00 |
| 8b | 17.5 | 150 | 29 | 33 | 1.45 |
| Control 1 | 15.0 | (floc) | 78 | — | 3.90 |
| Control 2 | 0 | — | 44 | 44 | 2.20 |

I claim:
1. A composite material comprising:
 a) 10 to 95 percent, by weight, matrix resin;
 b) 1 to 60 percent, by weight, fiber reinforcing material;
 c) 1 to 65 percent, by weight, aramid particles 50 to 500 microns in average diameter, substantially free from tentacles and having a surface area of less than 2 square meters per gram, wherein the weight ratio of aramid particles to fiber reinforcing material is greater than ¼.
2. The composite of claim 1 wherein the weight ratio of aramid particles to fiber reinforcing material is ¼ to ⁴⁄₁.
3. The composite of claim 1 wherein the matrix resin is selected from the group consisting of thermoset resin and thermoplastic resin.
4. The composite of claim 1 wherein the fiber reinforcing material is pulp with a length between 1 to 6 mm.
5. The composite of claim 4 wherein the fiber reinforcing material is aramid.
6. The composite of claim 5 wherein the aramid fiber reinforcing material is poly(p-phenylene terephthalamide).
7. The composite of claim 1 wherein the fiber reinforcing material is floc with a length between 1 to 6 mm.
8. The composite of claim 7 wherein the fiber reinforcing material is aramid.
9. The composite of claim 8 wherein the aramid fiber reinforcing material is poly(p-phenylene terephthalamide).
10. The composite of claim 1 wherein the aramid particles are poly(p-phenylene terephthalamide) and are 75 to 250 microns in average diameter.
11. The composite of claim 1 wherein the matrix resin is a thermoset phenolic material.
12. The composite of claim 11 wherein the fiber reinforcing material is poly(p-phenylene terephthalamide).
13. The composite of claim 12 wherein the aramid particles are poly(p-phenylene terephthalamide).
14. The composite of claim 1 wherein the matrix resin is a thermoplastic nylon material.
15. The composite of claim 14 wherein the fiber reinforcing material is poly(p-phenylene terephthalamide).
16. The composite of claim 15 wherein the aramid particles are poly(p-phenylene terephthalamide).

* * * * *